United States Patent
Ueno et al.

(10) Patent No.: US 11,260,900 B2
(45) Date of Patent: Mar. 1, 2022

(54) VEHICLE CONTROL SYSTEM, VEHICLE CONTROL METHOD, AND ELECTRIC POWER STEERING SYSTEM

(71) Applicant: Hitachi Automotive Systems, Ltd., Hitachinaka (JP)

(72) Inventors: Kentaro Ueno, Atsugi (JP); Hiroshi Ito, Isehara (JP); Takashi Tsutsui, Atsugi (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 533 days.

(21) Appl. No.: 16/330,673

(22) PCT Filed: Sep. 5, 2017

(86) PCT No.: PCT/JP2017/031861
§ 371 (c)(1),
(2) Date: Mar. 5, 2019

(87) PCT Pub. No.: WO2018/051838
PCT Pub. Date: Mar. 22, 2018

(65) Prior Publication Data
US 2019/0210638 A1    Jul. 11, 2019

(30) Foreign Application Priority Data
Sep. 16, 2016    (JP) .............................. JP2016-181334

(51) Int. Cl.
*B62D 5/04*    (2006.01)
*B62D 6/00*    (2006.01)
*B62D 15/02*    (2006.01)

(52) U.S. Cl.
CPC ............. *B62D 5/0463* (2013.01); *B62D 5/04* (2013.01); *B62D 5/0481* (2013.01); *B62D 6/00* (2013.01); *B62D 15/021* (2013.01)

(58) Field of Classification Search
CPC ...... B62D 5/0463; B62D 5/04; B62D 5/0481; B62D 15/021; B62D 6/00
See application file for complete search history.

(56) References Cited

U.S. PATENT DOCUMENTS 5,835,870 A    11/1998    Kagawa
6,212,452 B1    4/2001    Shimizu et al.
(Continued)

FOREIGN PATENT DOCUMENTS

DE    196 45 404 A1    8/1997
DE    10 2014 107 194 A1    11/2015
(Continued)

OTHER PUBLICATIONS

German-language Office Action issued in German Application No. 11 2017 004 674.2 dated Jun. 7, 2021 with English translation (nine (9) pages).

(Continued)

*Primary Examiner* — Kevin Hurley
*Assistant Examiner* — Marlon A Arce
(74) *Attorney, Agent, or Firm* — Crowell & Moring LLP

(57) ABSTRACT

A motor torque control section switches a change rate of a motor torque for approximating the motor torque to an assist torque according to relationship between the motor torque of an electric motor and the assist torque and according to a change in a turning angle, after automatic steering is cancelled according to a steering torque.

15 Claims, 7 Drawing Sheets

(56) References Cited

U.S. PATENT DOCUMENTS

| | | | | |
|---|---|---|---|---|
| 2013/0158798 A1* | 6/2013 | Igarashi | ................... | B62D 6/00 |
| | | | | 701/37 |
| 2014/0035493 A1* | 2/2014 | Ajima | ..................... | H02P 21/18 |
| | | | | 318/400.04 |
| 2015/0353128 A1* | 12/2015 | Shibuya | ................. | B62D 5/001 |
| | | | | 701/41 |
| 2017/0137060 A1 | 5/2017 | Wanner et al. | | |

FOREIGN PATENT DOCUMENTS

| | | |
|---|---|---|
| JP | 11-78936 A | 3/1999 |
| JP | 2004-256076 A | 9/2004 |
| JP | 2004-352001 A | 12/2004 |

OTHER PUBLICATIONS

International Search Report (PCT/ISA/210) issued in PCT Application No. PCT/JP2017/031861 dated Nov. 28, 2017 with English translation (two (2) pages).

Japanese-language Written Opinion (PCT/ISA/237) issued in PCT Application No. PCT/JP2017/031861 dated Nov. 28, 2017 (three (3)pages).

* cited by examiner

VEHICLE CONTROL SYSTEM, VEHICLE CONTROL METHOD, AND ELECTRIC POWER STEERING SYSTEM

TECHNICAL FIELD

The invention relates to vehicle control systems, vehicle control methods, and electric power steering systems.

BACKGROUND ART

A Patent Literature 1 discloses the technology of gradually approximating a motor torque to an assist torque when automatic steering is cancelled due to steering intervention (override) by a driver.

CITATION LIST

Patent Literature

PTL 1: Japanese Unexamined Patent Application Publication (Kokai) No. 2004-256076

SUMMARY OF INVENTION

Technical Problem

The above-mentioned related art causes the problem that a steering wheel makes temporary unintended motions, and steering feeling is deteriorated, depending on a steering state at the time of cancellation of automatic steering.

An object of the invention is to provide a vehicle control system, a vehicle control method, and an electric power steering system, which prevent the deterioration of steering feeling, which is caused by the cancellation of automatic steering.

Solution to Problem

A vehicle control system of one embodiment of the invention switches a change rate of a motor torque of an electric motor for approximating the motor torque to an assist torque according to relationship between the motor torque and the assist torque and according to a change of a turning angle, after the automatic steering is cancelled on the basis of a steering torque.

The one embodiment of the invention thus prevents deterioration of steering feeling, which is caused by cancellation of automatic steering.

DESCRIPTION OF EMBODIMENTS

Embodiment 1

Figure 1:
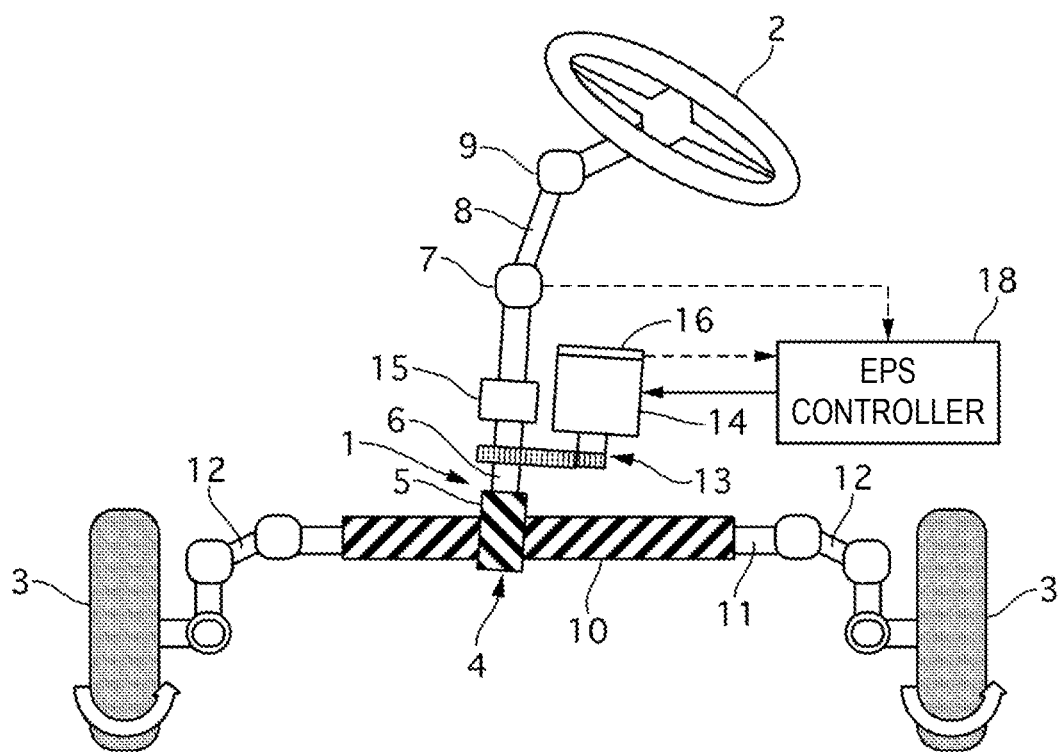
FIG. 1 shows a configuration of an electric power steering system according to an Embodiment 1.

FIG. 1 shows a configuration of an electric power steering system according to an Embodiment 1.

A steering mechanism 1 is adapted to turn front wheels (steered wheels) 3, 3 along with rotation of a steering wheel 2. The steering mechanism 1 includes a rack-and-pinion steering gear 4. The steering gear 4 includes a pinion gear 5 disposed on a pinion shaft 6. The pinion shaft 6 is coupled to a column shaft 8 through a joint 7. The column shaft 8 is coupled to the steering wheel 2. A joint 9 is disposed at a certain point of the column shaft 8. The steering gear 4 includes a rack gear 10 disposed in a rack shaft 11. The rack shaft 11 is coupled via tie rods 12, 12 to the front wheels 3, 3 at both ends. Coupled to the pinion shaft 6 via a speed reducer 13 is an electric motor (hereinafter, referred to as a motor) 14. A rotary torque from the motor 14 is transmitted through the speed reducer 13 to the pinion shaft 6. A torque sensor 15 is disposed on the pinion shaft 6. The torque sensor 15 detects a torque acting on the pinion shaft 6 in accordance with a twist amount of a torsion bar, not shown, disposed on the pinion shaft 6. A resolver 16 is attached to the motor 14. The resolver 16 detects a rotation angle of the motor 14. An EPS controller 18 implements drive control on the motor 14 in accordance with a steering torque and running conditions (vehicle speed and other conditions) and thus implements assist control which applies an assist torque to the steering mechanism 1. During automatic operation selected by the driver, the EPS controller 18 implements the drive control on the motor 14 in accordance with a target turning angle for automatic steering, which is transmitted from an AD controller 17 (see FIG. 2), the steering torque, and the motor rotation angle, to thereby implement automatic steering control, by which the front wheels 3, 3 are automatically steered.

Figure 2:
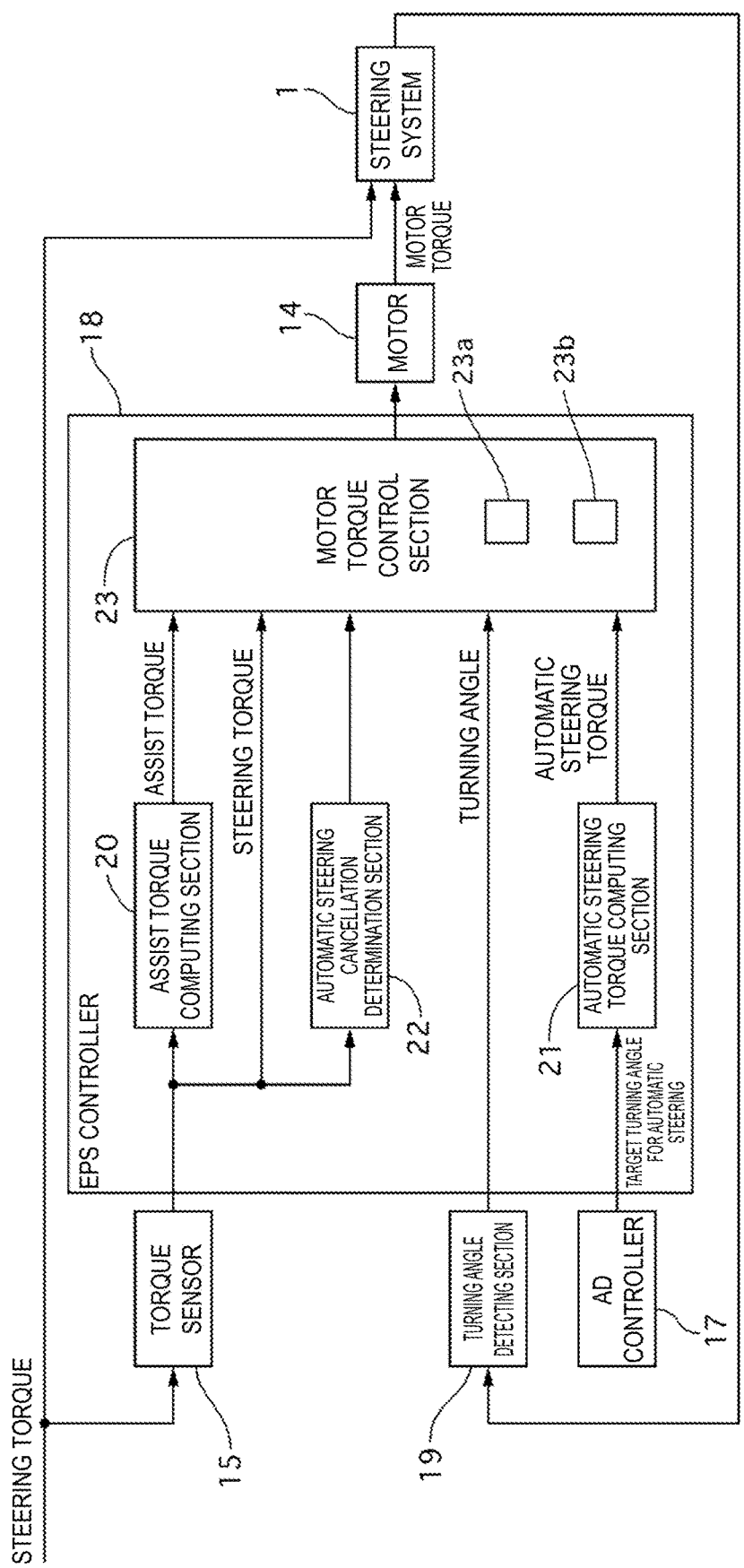
FIG. 2 is a configuration diagram of a vehicle control system according to the Embodiment 1.

FIG. 2 is a configuration diagram of a vehicle control system according to the Embodiment 1.

The AD controller 17 creates a target vehicle speed for automatic vehicle speed control and the target turning angle for automatic steering and causes a vehicle to travel along a target pathway during the automatic operation. According to the Embodiment 1, the target vehicle speed for automatic vehicle speed control is transmitted to an engine controller and a brake controller, neither shown. The target turning angle for automatic steering is transmitted to the EPS controller 18. The engine controller and the brake controller implement the automatic vehicle speed control for controlling an engine and a brake system during the automatic operation so that the vehicle speed equals the target vehicle speed for automatic vehicle speed control.

A turning angle detecting section 19 detects a turning angle of the front wheels 3, 3. According to the Embodiment 1, the turning angle is calculated from the motor rotation angle detected by the resolver 16. The turning angle may be calculated from a rotation angle of the steering wheel 2, the column shaft 8 or the pinion shaft 6.

The EPS controller 18 includes an assist torque computing section 20, an automatic steering torque computing section 21, an automatic steering cancellation determination section 22, and a motor torque control section 23. The assist torque computing section 20 computes the assist torque for reducing the driver's steering load according to the steering torque (assist torque computing step). The assist torque has such characteristics that it increases with the increase of the steering torque and decreases with the decrease of the vehicle speed. The automatic steering torque computing section 21 computes an automatic steering torque which is necessary to make the turning angle of the front wheels 3, 3 equal to the target turning angle for automatic steering (automatic steering torque computing step). The automatic steering cancellation determination section 22 determines, according to the steering torque, whether the driver has executed steering intervention (override). If determining that override has been executed, the automatic steering cancellation determination section 22 outputs an automatic steering cancel command to the motor torque control section 23. During the automatic steering (automatic operation), the motor torque control section 23 controls current to be supplied to the motor 14, using the automatic steering torque as a target value. During manual steering, the motor torque control section 23 controls the current to be supplied to the motor 14, using the assist torque as a target value. When the automatic steering is cancelled due to override during the automatic steering, the motor torque control section 23 switches the target of an output torque (motor torque) of the motor 14 from the automatic steering torque to the assist torque. The motor torque control section 23 of the Embodiment 1 intends to prevent deterioration of steering feeling, which is caused at the time of cancellation of the automatic steering, and implements motor torque control as discussed below.

Figure 3:
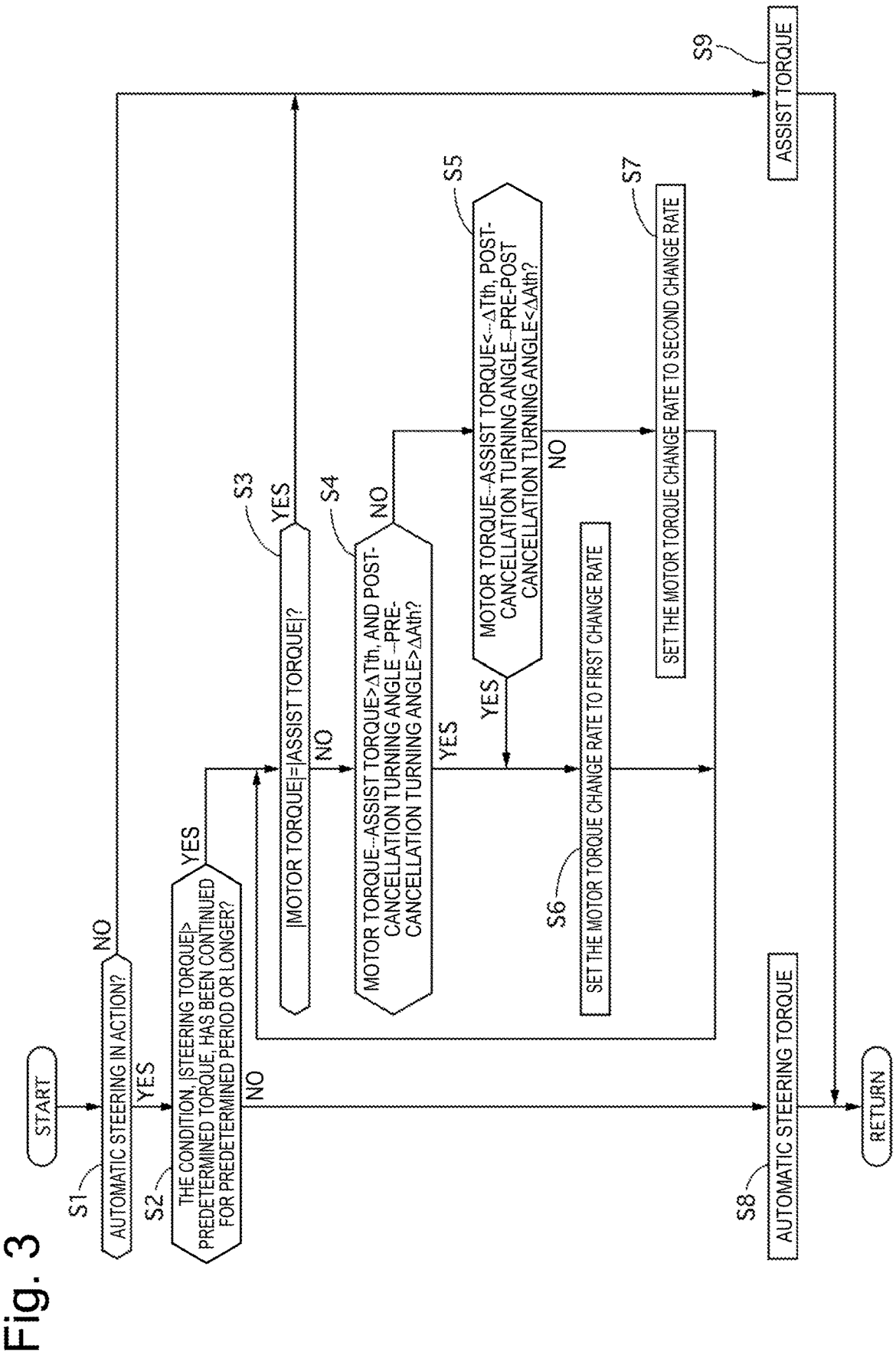
FIG. 3 is a flowchart showing a flow of motor torque control processing by a motor torque control section 23 of the Embodiment 1.

FIG. 3 is a flowchart showing a flow of motor torque control processing by the motor torque control section 23 according to the Embodiment 1. Positive and negative values respectively indicate right turn steering and left turn steering as viewed from the driver's seat. The motor torque control section 23 includes a rate change switch determination section 23a as a constitution for carrying out the motor torque control processing of the Embodiment 1.

Step S1 determines whether the automatic steering is active. If the determination is YES, the processing advances to Step S2. If NO, the processing advances to Step S9.

Step S2 determines whether an absolute value of the steering torque has been larger than a predetermined torque for a predetermined period or longer (automatic steering cancellation determination step). If the determination is YES, the processing advances to Step S3. If No, the processing advances to Step S8. The predetermined torque is set to a torque which enables the determination that the driver holds the steering wheel 2. For example, the predetermined torque is set to a torque larger than a torque corresponding to inertia moment of the steering wheel 2, which is detected by the torque sensor 15 when the driver's hands are off the steering wheel 2. A certain amount of time (predetermined period) is provided for making the automatic steering cancellation determination, so that it is possible to prevent an erroneous determination as to the automatic steering cancellation, which is attributable to a sensor noise or the like, and it is also possible to determine with accuracy that the automatic steering is switched to the manual steering due to the override by the driver.

Step S3 determines whether an absolute value of the motor torque equals an absolute value of the assist torque. If the determination is YES, the processing advances to Step S9. If No, the processing advances to Step S4.

In Step S4, the rate change switch determination section 23a determines whether change rate switch conditions are satisfied (change rate switch determination step). The change rate switch conditions include that a torque difference obtained by deducting a current assist torque from a current motor torque be larger than a predetermined torque difference threshold value ΔTth, and that an angle difference obtained by deducting a pre-cancellation turning angle from a current turning angle be larger than a predetermined angle difference threshold value ΔAth. If the determination is YES, the processing advances to Step S6. If NO, the processing advances to Step S5. The torque difference threshold value ΔTth is set to zero or more. The pre-cancellation turning angle is a turning angle which is formed before the determination of the automatic steering cancellation and is immediate to a time point when the automatic cancellation is determined. The angle difference threshold value ΔAth is set to an angle difference larger than zero.

In Step S5, the rate change switch determination section 23a determines whether change rate switch conditions are satisfied (change rate switch determination step). The change rate switch conditions include that the torque difference obtained by deducting the current assist torque from the current motor torque be smaller than a predetermined torque difference threshold value −ΔTth, and that an angle difference obtained by deducting the pre-cancellation turning angle from the current turning angle be smaller than a predetermined angle difference threshold value −ΔAth. If the determination is YES, the processing advances to Step S6. If NO, the processing advances to Step S7.

Step S6 decides a target value of the motor torque so that the change rate (amount of change per unit time) of the motor torque equals a first change rate (step of controlling a motor torque at automatic steering cancellation). The first change rate is a change rate of the motor torque for quickly approximating the motor torque to the assist torque. The target value of the motor torque may be the assist torque, and therefore, the motor torque may be instantly made equal to the assist torque.

Step S7 decides the target value of the motor torque so that the change rate of the motor torque equals a second change rate (step of controlling a motor torque at automatic steering cancellation). The second change rate is a change rate of the motor torque for gradually approximating the motor torque to the assist torque. The second change rate is a rate which is lower than the first change rate and yet does not give uncomfortable feeling to the driver.

In Step S8, the target value of the motor torque is set to the automatic steering torque.

In Step S9, the target value of the motor torque is set to the assist torque.

Operation and advantageous effects of the invention according to the Embodiment 1 will be now discussed.

Figure 4:
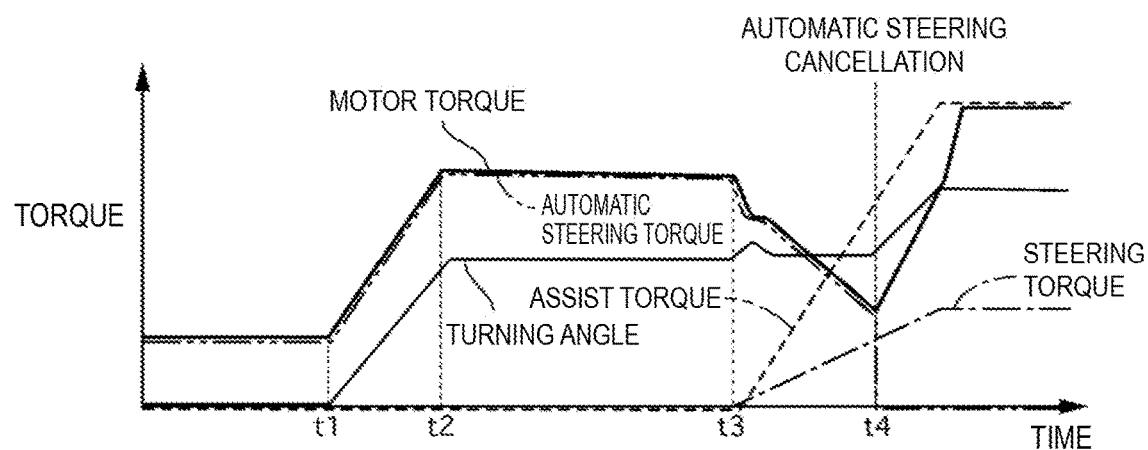
FIG. 4 is a time chart showing changes of a motor torque at the time of cancellation of automatic steering in a vehicle control system according to related art.

FIG. 4 is a time chart showing changes of a motor torque when automatic steering is cancelled in a vehicle control system according to related art.

At time t1, an automatic steering torque starts increasing during the automatic steering. In a time interval between the time t1 and time t2, the motor torque increases along with the automatic steering torque, which increases a turning angle of front wheels. Since the driver's hands are off the steering wheel, the steering torque (i.e., torsion bar torque) is zero, and an assist torque also remains zero.

At the time t2, the automatic steering torque stops increasing. In a time interval between the time t2 and time t3, the motor torque and the turning angle remain constant.

At the time t3, the driver starts turning the steering wheel back. In a time interval between the time t3 and time t4, the assist torque increases as a result of increase of the steering torque. The automatic steering torque decreases in order to maintain the turning angle, which is followed by a decrease in the motor torque.

At the time t4, the automatic steering is cancelled due to an override determination and transited to the manual steering. When the automatic steering is transited to the manual steering, the vehicle control system of the related art changes the motor torque so that the torque difference between the assist torque and the automatic steering torque is gradually approximated to each other in order to make the motor torque equal to the assist torque. This prevents the motor torque from rapidly changing from the automatic steering torque to the assist torque and continues to provide a good steering feeling.

Figure 5:
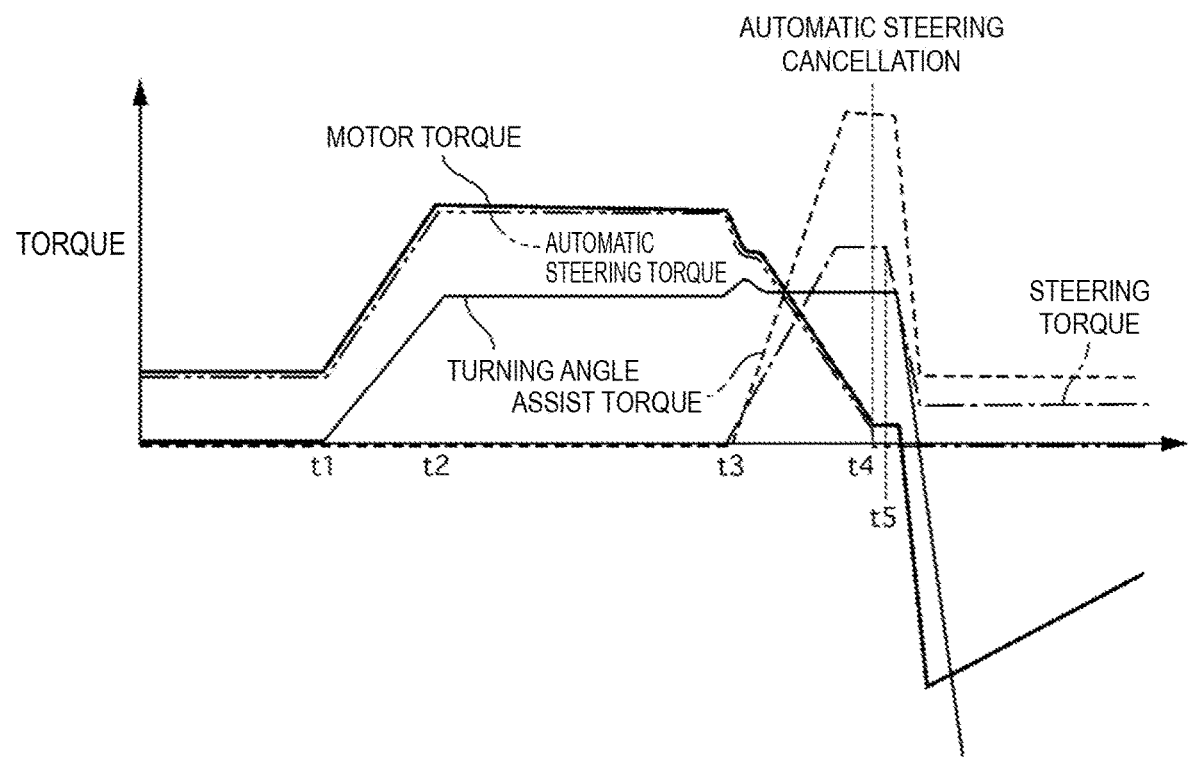
FIG. 5 is a time chart showing changes of the motor torque in a situation where a steering wheel makes an unexpected motion at the time of cancellation of the automatic steering in the vehicle control system according to the related art.

In the vehicle control system of the related art, however, the steering wheel sometimes makes a temporary unexpected motion and thus deteriorates the steering feeling, depending on the steering state at the time of cancellation of the automatic steering. FIG. 5 shows changes of the motor torque in such an event.

The time interval between the time t1 and the time t3 is similar to that shown in FIG. 4, and therefore will not be explained below.

At the time t3, the driver starts providing additional steering. In the time interval between the time t3 and the time t4, the driver provides more additional steering than in FIG. 4. An increase rate of the steering torque and that of the assist torque based on the steering torque are higher than those in FIG. 4. A decrease rate of the automatic steering torque and that of the motor torque are also higher than those in FIG. 4.

At the time t4, the automatic steering is cancelled as it is determined that override has been executed. The automatic steering is then transited to the manual steering.

At time t5, the driver reduces grip force on the steering wheel. This causes a sharp decline in the steering torque, which is followed by a sharp decline in the assist torque. At this point of time, the motor torque is generated so as to gradually reduce the torque difference between the assist torque and the automatic steering torque. The motor torque then decreases by amount corresponding to the decrease of the assist torque. This generates a large motor torque acting in an opposite direction to a steering direction of the steering wheel. The motor torque thereafter gradually increases. The steering wheel then rapidly rotates in the opposite direction to the steering direction (hereinafter, referred to as a rapid opposite rotation of the steering wheel) against the driver's intentions, deteriorating the steering feeling. Further, the front wheels are turned along with the motion of the steering wheel, leading to a turning behavior against the driver's intentions.

Unlike the above-discussed related art, the motor torque control section 23 according to the Embodiment 1 is so configured as to detect the rapid opposite rotation of the steering wheel 2 after the determination of automatic steering cancellation, according to relationship between the motor torque and the assist torque and according to a change in the turning angle of the front wheels 3, 3, and then switch the change rate of the motor torque for approximating the motor torque to the assist torque. More specifically, after it is determined that the automatic steering has been cancelled, the motor torque control section 23 determines whether the change rate switch conditions are satisfied (Steps S4 and S5). The change rate switch conditions include that the torque difference obtained by deducting the assist torque from the motor torque be larger than the torque difference threshold value ΔTth (or smaller than −ΔTth), and that the angle difference obtained by deducting the pre-cancellation turning angle from the turning angle be larger than the angle difference threshold value ΔAth (or smaller than −ΔAth).

In other words, if the motor torque after the automatic steering cancellation is excessive relative to the assist torque, and the turning angle after the automatic steering cancellation decreases relative to the turning angle before the automatic steering cancellation, it can be determined that a large motor torque is generated to act in the opposite direction to the steering direction of the steering wheel 2. When the change rate switch conditions are satisfied, the change rate of the motor torque is set to the first change rate (Step S6), and the motor torque is immediately approximated to the assist torque. This prevents the rapid opposite rotation of the steering wheel 2. It is then possible to prevent an unintended motion of the steering wheel 2 and that of the vehicle.

If the motor torque after the automatic steering cancellation is insufficient relative to the assist torque or if the turning angle after the automatic steering cancellation increases relative to the turning angle before the automatic steering is cancelled, it can be determined that the steering wheel 2 is not making the rapid opposite rotation. If the change rate switch conditions are not satisfied, therefore, the change rate of the motor torque is set to the second change rate (Step S7), and the motor torque is slowly approximated to the assist torque. By so doing, good steering feeling can be maintained by restraining an abrupt change of the motor torque when the steering wheel 2 is not making the rapid opposite rotation.

Figure 6:
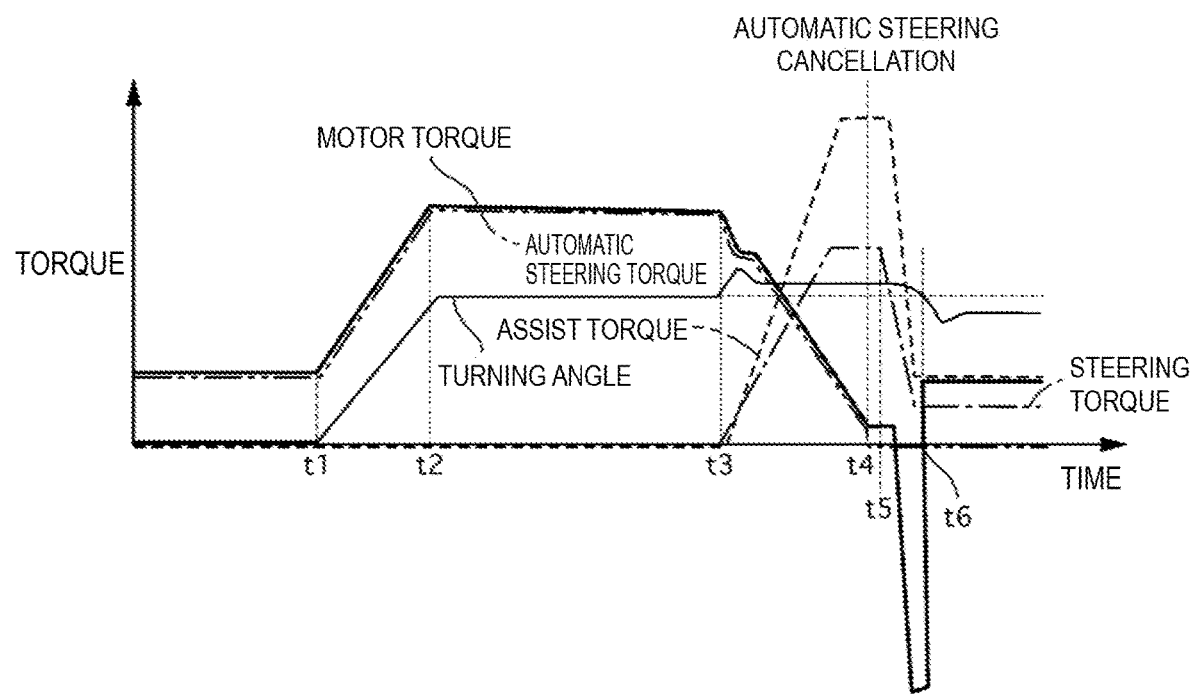
FIG. 6 is a time chart showing changes of a motor torque at the time of cancellation of automatic steering in a vehicle steering system according to the Embodiment 1.

FIG. 6 is a time chart showing changes of the motor torque when automatic steering is cancelled in the vehicle steering system according to the Embodiment 1.

The time interval between the time t1 and the time t5 is similar to that shown in FIG. 5, and therefore will not be explained below.

In the time interval between the time t5 and time t6, the driver reduces the grip force on the steering wheel 2, causing a sharp decline in the motor torque. The motor torque therefore has an opposite sign to the assist torque.

At the time t6, the angle difference obtained by deducting the pre-cancellation turning angle from a current turning angle is smaller than the angle difference threshold value −ΔAth. The rate change switch conditions are satisfied, and the change rate of the motor torque is switched from the second change rate to the first change rate. According to the Embodiment 1, when it is detected that a large motor torque is generated to act in the opposite direction to the steering direction of the steering wheel 2, the rate for approximating the motor torque to the assist torque is increased. The rapid opposite rotation of the steering wheel 2 is restrained, as compared to the related art shown in FIG. 5.

Embodiment 2

An Embodiment 2 is similar in basic constitution to the Embodiment 1, and the following description only explains differences from the Embodiment 1.

Figure 7:
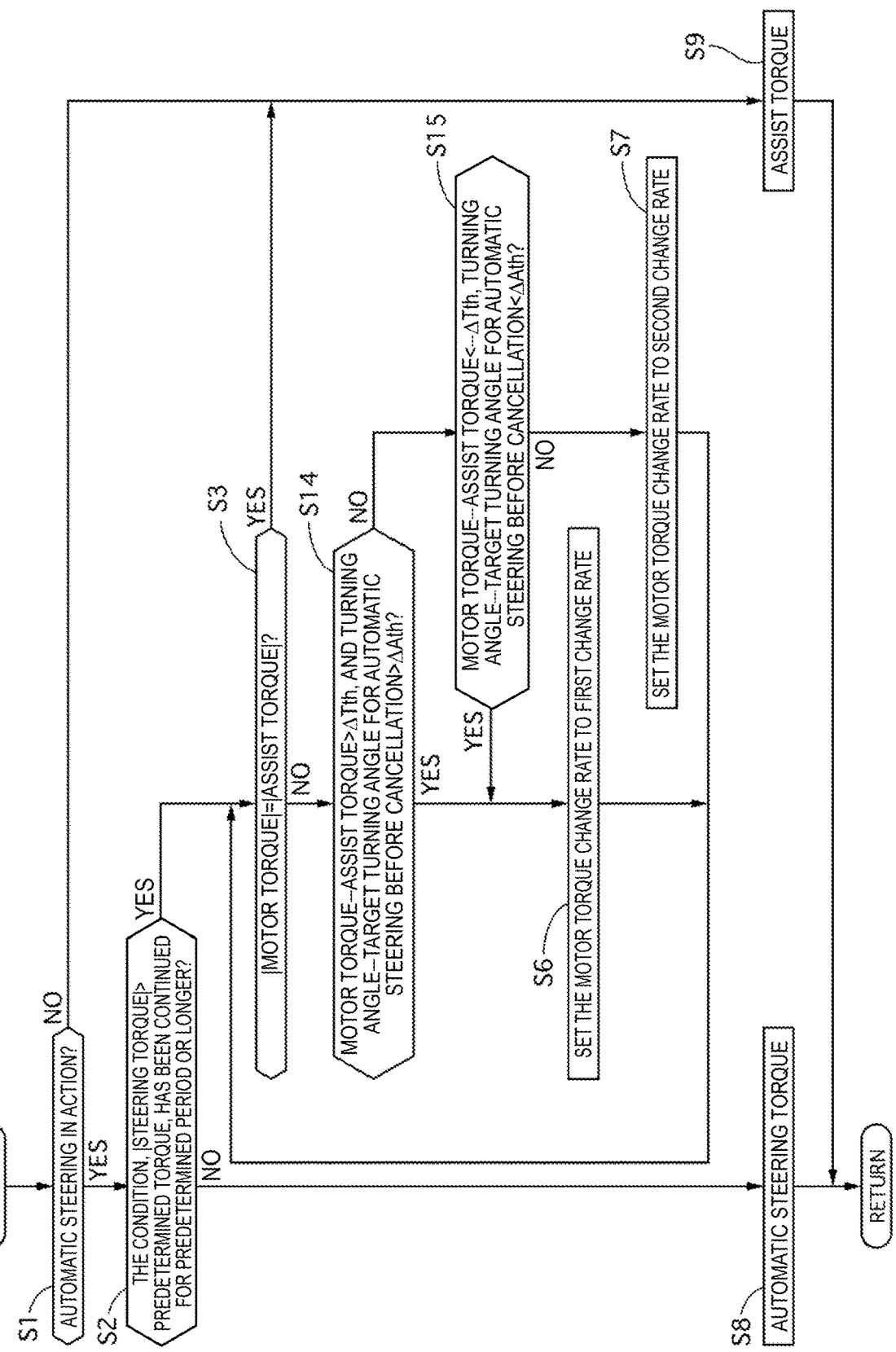
FIG. 7 is a flowchart showing a flow of motor torque control processing by a motor torque control section 23 according to an Embodiment 2.

FIG. 7 is a flowchart showing a flow of motor torque control processing by a motor torque control section 23 according to the Embodiment 2.

In Step S14, the rate change switch determination section 23a determines whether change rate switch conditions are satisfied (change rate switch determination step). The change rate switch conditions include that a torque difference obtained by deducting a current assist torque from a current motor torque be larger than a predetermined torque difference threshold value $\Delta$Tth, and that an angle difference obtained by deducting a target turning angle for pre-cancellation automatic steering from a current turning angle be larger than a predetermined angle difference threshold value $\Delta$Ath. If the determination is YES, the processing advances to Step S6. If NO, the processing advances to Step S15. The target turning angle for pre-cancellation automatic steering is a target turning angle for automatic steering, which is formed before the determination of the automatic steering cancellation and is immediate to a time point when the automatic cancellation is determined. The pre-cancellation turning angle is determined by the target turning angle for pre-cancellation automatic steering. Accordingly, even if the target turning angle for pre-cancellation automatic steering is used, instead of the pre-cancellation turning angle, it is still possible to detect a state where a large motor torque is generated in an opposite direction to a steering direction of a steering wheel 2.

In Step S15, the rate change switch determination section 23a determines whether change rate switch conditions are satisfied (change rate switch determination step). The change rate switch conditions include that a torque difference obtained by deducting a current assist torque from a current motor torque be smaller than a predetermined torque difference threshold value $-\Delta$Tth, and that an angle difference obtained by deducting a target turning angle for pre-cancellation automatic steering from a current turning angle be smaller than a predetermined angle difference threshold value $-\Delta$Ath. If the determination is YES, the processing advances to Step S6. If NO, the processing advances to Step S7.

During a period between a determination of YES at Step S2 and a determination of YES at Step S4 or S5 of the motor torque control illustrated in FIG. 7, namely, while a motor torque change rate is a second change rate, the motor torque control section 23 of the Embodiment 2 implements motor torque change rate correction control in the manner explained below. The motor torque control section 23 includes a turning angle rate determination section 23b as a constitution for carrying out processing of the motor torque change rate correction control according to the Embodiment 2.

Figure 8:
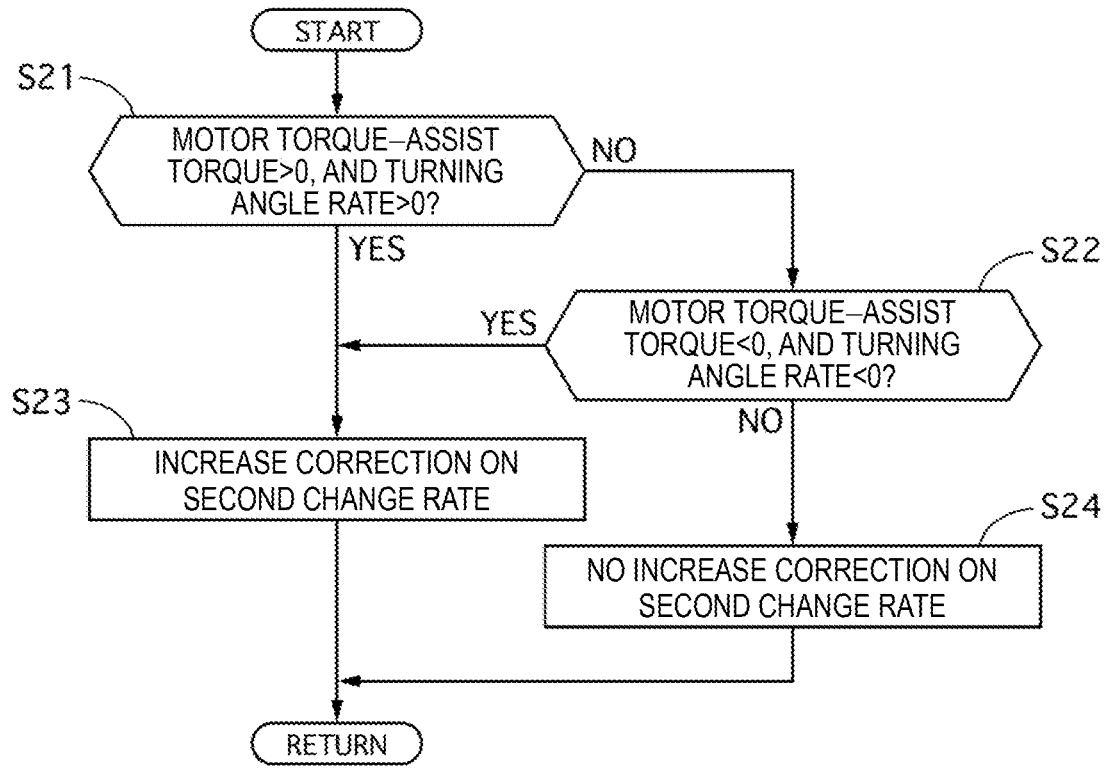
FIG. 8 is a flowchart showing a flow of processing of motor torque change rate correction control by the motor torque control section 23 according to the Embodiment 2.

FIG. 8 is a flowchart showing a flow of the processing of the motor torque change rate correction control by the motor torque control section 23 according to the Embodiment 2.

In Step S21, the turning angle rate determination section 23b determines whether turning angle rate conditions are satisfied (turning angle rate determination step). The turning angle rate conditions include that a torque difference obtained by deducting the assist torque from the motor torque be a positive value, and that a turning angle rate of front wheels 3, 3 be a positive value. If the determination is YES, the processing advances to Step S23. If NO, the processing advances to Step S22.

In Step S22, the turning angle rate determination section 23b determines whether turning angle rate conditions are satisfied (turning angle rate determination step). The turning angle rate conditions include that a torque difference obtained by deducting the assist torque from the motor torque be a negative value, and that the turning angle rate of the front wheels 3, 3 be a negative value. If the determination is YES, the processing advances to Step S23. If NO, the processing advances to Step S24.

Step S23 makes a correction which increases the second change rate that is a target value for a change rate of the motor torque in Step S7. A correction amount of the second change rate is, for example, a value obtained by multiplying the turning angle rate of the front wheels 3, 3 by a predetermined gain. The second change rate is corrected to a value that increases with the increase of the turning angle rate.

Step S24 does not make the correction which increases the second change rate.

Figure 9:
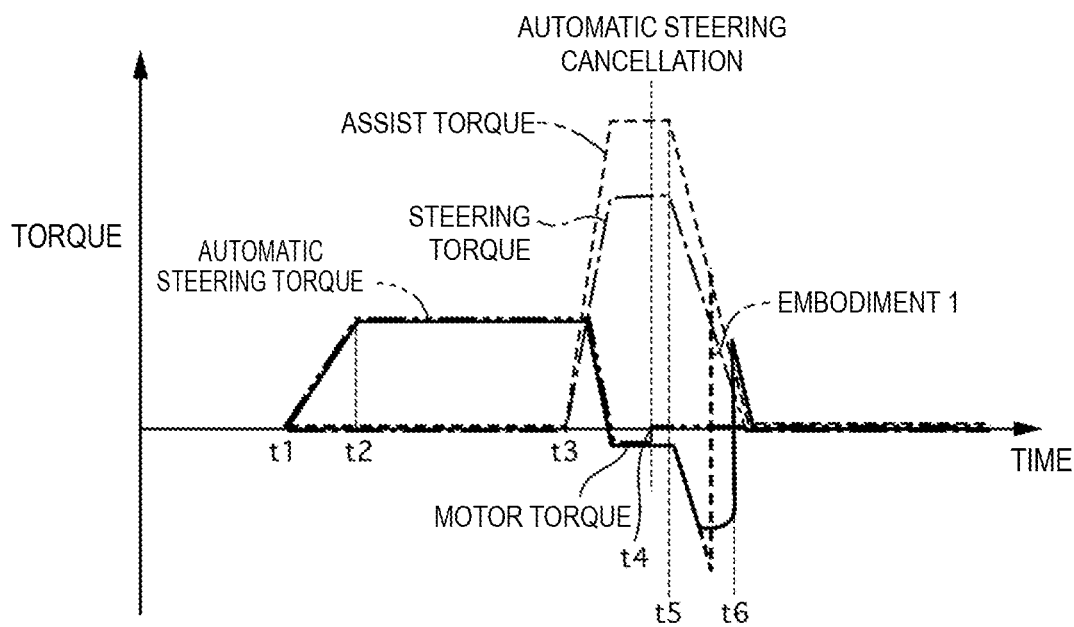
FIG. 9 is a time chart showing changes of a motor torque at the time of cancellation of automatic steering in a vehicle steering system according to the Embodiment 2.

FIG. 9 is a time chart showing changes of a motor torque at the time of cancellation of automatic steering in the vehicle steering system according to the Embodiment 2.

A time interval between time t1 and time t5 is similar to that shown in FIG. 6, and therefore will not be explained below.

In a time interval between the time t5 and time t6, the driver reduces grip force on the steering wheel 2, which generates a large motor torque acting in the opposite direction to the steering direction of the steering wheel 2. According to the Embodiment 2, since the second change rate increases with the increase of the turning angle rate, the change of the motor torque is further restrained, as compared to the Embodiment 1 in which the second change rate is constant. This prevents a rapid opposite rotation of the steering wheel 2, thereby preventing deterioration of steering feeling.

At the time t6, the rate change switch conditions are satisfied, and the change rate of the motor torque is switched from the second change rate to the first change rate. In the Embodiment 2, the change of the motor torque is further restrained as the turning angle rate increases. The achievement of the rate switch conditions is therefore further delayed than in the Embodiment 1. Consequently, the change rate of the motor torque is switched while the assist torque is further decreased, so that a torque level difference at the time of changing the motor torque at the first change rate is smaller than in the Embodiment 1. The steering feeling is therefore further prevented from being deteriorated.

Other Embodiments

The embodiments for carrying out the invention have been explained. The specific constitution of the invention is not limited to those of the embodiments, and all design modifications and the like made without deviating from the gist of the invention are intended to be included in the invention.

The motor of the electric power steering system may be coupled to the column shaft. Alternatively, the motor may be coupled to the rack shaft through a second pinion shaft or a belt.

The following are situations where the invention is applied. In other words, the list below describes the situations where the steering wheel is rapidly rotated in the opposite direction.

(1) Situation in which the steering torque is greatly increased (positive side) due to override for emergency avoidance during the automatic steering (target turning angle for automatic steering: positive side, turning angle: positive side), and thereafter, the steering torque is released.

(2) Situation in which the steering the steering torque is greatly increased (positive side) due to override for emergency avoidance during automatic steering (target turning angle for automatic steering: positive side, turning angle: positive side), and thereafter, the steering wheel is turned in the opposite direction (negative side).

(3) Situation in which the steering torque is greatly increased (positive side) due to override for emergency avoidance during automatic steering (target turning angle for automatic steering: positive side, turning angle: negative side), and thereafter, the steering torque is released.

(4) Situation in which the steering torque is greatly increased (positive side) due to override for emergency avoidance during the automatic steering (target turning angle for automatic steering: positive side, and turning angle: negative side), and thereafter, the steering wheel is turned in the opposite direction (negative side).

(5) Situation in which the steering torque is released during the automatic steering (target turning angle for automatic steering: neutral, turning angle: positive side).

(6) Situation in which the steering wheel is turned in the opposite direction (negative side) during the automatic steering (target turning angle for automatic steering: neutral, turning angle: positive side).

In each of the situations, the motor torque (negative side) becomes smaller than the assist torque (positive side) after the automatic steering is cancelled, causing the steering wheel to rotate rapidly to the negative side. A similar thing occurs when positive and negative are switched around in the above-listed situations.

If the invention is applied in the foregoing situations, the rapid rotation of the steering wheel can be prevented.

Technical ideas which can be understood from the foregoing embodiments are as follows.

In one aspect, a vehicle control system for a vehicle with an electric power steering system. The electric power steering system comprises a steering mechanism configured to turn a steered wheel of a vehicle; an electric motor configured to apply steering force to the steering mechanism; a torque sensor configured to detect a steering torque which is generated in the steering mechanism; and a turning angle detecting section configured to detect a turning angle of the steered wheel. The vehicle control system for a vehicle comprises an assist torque computing section configured to compute an assist torque corresponding to the steering torque detected by the torque sensor; an automatic steering torque computing section configured to compute an automatic steering torque for carrying out automatic steering of the steered wheel; and a section for controlling a motor torque at automatic steering cancellation, which is configured to switch a change rate of the motor torque for approximating the motor torque to the assist torque according to relationship between the motor torque of the electric motor and the assist torque and according to a change in the turning angle detected by the turning angle detecting section, after the automatic steering is cancelled based on the steering torque detected by the torque sensor.

In a further preferable aspect according to the foregoing aspect, the vehicle control system comprises an automatic steering cancellation determination section configured to determine that the automatic steering is cancelled in a case where the time when the steering torque detected by the torque sensor is larger than a predetermined torque continues for a predetermined period of time or longer than the predetermined period of time during the automatic steering.

In another preferable aspect according to any one of the foregoing aspects, the section for controlling a motor torque at automatic steering cancellation comprises a change rate switch determination section configured to determine whether change rate switch conditions are satisfied. The conditions include that torque difference that is difference between the motor torque after the automatic steering cancellation determination by the automatic steering cancellation determination section and the assist torque be larger than a torque difference threshold value, that angle difference that is difference between the turning angle after the automatic steering cancellation determination by the automatic steering cancellation determination section and the turning angle during the automatic steering before the cancellation determination be larger than an angle difference threshold value, and that the torque difference and the angle difference have values with the same sign. When the change rate switch determination section determines that the change rate switch conditions are satisfied, the change rate of the motor torque for approximating the motor torque to the assist torque is increased higher than when the change rate switch determination section determines that the change rate switch conditions are not satisfied.

In still another preferable aspect according to any one of the foregoing aspects, the section for controlling a motor torque at automatic steering cancellation comprises a turning angle rate determination section configured to determine whether a turning angle rate condition that the torque difference and the turning angle rate of the steered wheel have values with the same sign is satisfied. When the turning angle rate determination section determines that the turning angle rate condition is satisfied, the change rate of the motor torque for approximating the motor torque to the assist torque is increased higher than when the turning angle rate determination section determines that the turning angle rate condition is not satisfied.

In still another preferable aspect according to any one of the foregoing aspects, the section for controlling a motor torque at automatic steering cancellation comprises a change rate switch determination section configured to determine whether change rate switch conditions are satisfied. The conditions include that torque difference that is difference between the motor torque after the automatic steering cancellation determination by the automatic steering cancellation determination section and the assist torque be larger than a torque difference threshold value, that angle difference that is difference between the turning angle after the automatic steering cancellation determination by the automatic steering cancellation determination section and a target turning angle for the automatic steering before the cancellation determination be larger than an angle difference threshold value, and that the torque difference and the angle difference have values with the same sign. When the change rate switch determination section determines that the change rate switch conditions are satisfied, the change rate of the motor torque for approximating the motor torque to the assist torque is increased higher than when the change rate switch determination section determines that the change rate switch conditions are not satisfied.

From another perspective, a vehicle control method according to one aspect is a vehicle control method for a vehicle with an electric power steering system. The electric power steering system comprises a steering mechanism configured to turn a steered wheel of a vehicle, an electric motor configured to apply steering force to the steering mechanism, a torque sensor configured to detect a steering torque which is generated in the steering mechanism, and a turning angle detecting section configured to detect a turning angle of the steered wheel. The vehicle control method for a vehicle comprises an assist torque computing step configured to compute an assist torque corresponding to a steering torque detected by the torque sensor; an automatic steering torque computing step configured to compute an automatic steering torque for carrying out automatic steering of the steered wheel; and a step of controlling a motor torque at automatic steering cancellation, which switches a change rate of the motor torque for approximating the motor torque to the assist torque according to relationship between the motor torque of the electric motor and the assist torque and according to a change in the turning angle detected by the turning angle detecting section, after the automatic steering is cancelled based on the steering torque detected by the torque sensor.

In a further preferable aspect according to the foregoing aspect, the vehicle control method for a vehicle comprises an automatic steering cancellation determination step configured to determine that the automatic steering is cancelled in a case where the time when the steering torque detected by the torque sensor is larger than a predetermined torque continues for a predetermined period or longer than the predetermined period during the automatic steering.

In another preferable aspect according to any one of the foregoing aspects, the step of controlling a motor torque at automatic steering cancellation comprises a change rate switch determination step configured to determine whether change rate switch conditions are satisfied. The conditions include that torque difference that is difference between the motor torque after the automatic steering cancellation determination by the automatic steering cancellation determination step and the assist torque be larger than a torque difference threshold value, that angle difference that is difference between the turning angle after the automatic steering cancellation determination by the automatic steering cancellation determination step and the turning angle during the automatic steering before the cancellation determination be larger than an angle difference threshold value, and that the torque difference and the angle difference have values with the same sign. When the change rate switch determination step determines that the change rate switch conditions are satisfied, the change rate of the motor torque for approximating the motor torque to the assist torque is increased higher than when it is determined that the change rate switch conditions are not satisfied.

In still another aspect according to any one of the foregoing aspects, the step of controlling a motor torque at automatic steering cancellation comprises a turning angle rate determination step configured to determine whether a turning angle rate condition that the torque difference and a turning angle rate of the steered wheel have values with the same sign is satisfied. When the turning angle rate determination step determines that the turning angle rate condition is satisfied, the change rate of the motor torque for approximating the motor torque to the assist torque is increased higher than when the turning angle rate determination step determines that the turning angle rate condition is not satisfied.

In still another aspect according to any one of the foregoing aspects, the step of controlling a motor torque at automatic steering cancellation comprises a change rate switch determination step configured to determine whether change rate switch conditions are satisfied. The conditions include that torque difference that is difference between the motor torque after the automatic steering cancellation determination by the automatic steering cancellation determination step and the assist torque be larger than a torque difference threshold value, that angle difference that is difference between the turning angle after the automatic steering cancellation determination by the automatic steering cancellation determination step and a target turning angle for the automatic steering before the cancellation determination be larger than an angle difference threshold value, and that the torque difference and the angle difference have values with the same sign. When the change rate switch determination step determines that the change rate switch conditions are satisfied, the change rate of the motor torque for approximating the motor torque to the assist torque is increased higher than when the change rate switch determination step determines that the change rate switch conditions are not satisfied.

From another perspective, an electric power steering system according to one aspect comprises a steering mechanism configured to turn a steered wheel of a vehicle; an electric motor configured to apply steering force to the steering mechanism; a torque sensor configured to detect a steering torque which is generated in the steering mechanism; a turning angle detecting section configured to detect a turning angle of the steered wheel; an assist torque computing section configured to compute an assist torque corresponding to the steering torque detected by the torque sensor; an automatic steering torque computing section configured to compute an automatic steering torque for carrying out automatic steering of the steered wheel; and a section for controlling a motor torque at automatic steering cancellation, which is configured to switch a change rate of the motor torque for approximating the motor torque to the assist torque according to relationship between the motor torque of the electric motor and the assist torque and according to a change in the turning angle detected by the turning angle detecting section, after the automatic steering is cancelled according to the steering torque detected by the torque sensor.

In a further preferable aspect according to the foregoing aspect, the electric power steering system comprises an automatic steering cancellation determination section configured to determine that the automatic steering is cancelled in a case where the time when the steering torque detected by the torque sensor is larger than a predetermined torque continues for a predetermined period of time or longer than the predetermined period of time during the automatic steering.

In another preferable aspect according to any one of the foregoing aspects, the section for controlling a motor torque at automatic steering cancellation comprises a change rate switch determination section configured to determine whether change rate switch conditions are satisfied. The conditions include that torque difference that is difference between the motor torque after the automatic steering cancellation determination by the automatic steering cancellation determination section and the assist torque be larger than a torque difference threshold value, that angle difference that is difference between the turning angle after the automatic steering cancellation determination by the automatic steering cancellation determination section and the turning angle during the automatic steering before the cancellation determination be larger than an angle difference threshold value, and that the torque difference and the angle difference have values with the same sign. When the change rate switch determination section determines that the change rate switch conditions are satisfied, the change rate of the motor torque for approximating the motor torque to the assist torque is increased higher than when the change rate switch determination section determines that the change rate switch conditions are not satisfied.

In still another preferable aspect according to any one of the foregoing aspects, the section for controlling a motor torque at automatic steering cancellation comprises a turning angle rate determination section configured to determine whether a turning angle rate condition that the torque difference and a turning angle rate of the steered wheel have values with the same sign is satisfied. When the turning angle rate determination section determines that the turning angle rate condition is satisfied, the change rate of the motor torque for approximating the motor torque to the assist torque is increased higher than when the turning angle rate determination section determines that the turning angle rate condition is not satisfied.

In still another preferable aspect according to any one of the foregoing aspects, the section for controlling a motor torque at automatic steering cancellation comprises a change rate switch determination section configured to determine whether change rate switch conditions are satisfied. The conditions include that torque difference that is difference between the motor torque after the automatic steering cancellation determination by the automatic steering cancellation determination section and the assist torque be larger than a torque difference threshold value, that angle difference that is difference between the turning angle after the automatic steering cancellation determination by the automatic steering cancellation determination section and a target turning angle of the automatic steering before the cancellation determination be larger than an angle difference threshold value, and that the torque difference and the angle difference have values with the same sign. When the change rate switch determination section determines that the change rate switch conditions are satisfied, the change rate of the motor torque for approximating the motor torque to the assist torque is increased higher than when the change rate switch determination section determines that the change rate switch conditions are not satisfied.

The invention is not limited to the embodiments and may be modified in various ways. For example, the embodiments are presented to facilitate understanding of the invention and do not necessarily have to include all the constitutions discussed above. The constitution of one of the embodiments may be partially replaced with or incorporated into the constitution of another one of the embodiments. It is also possible to incorporate or replace the constitution of one of the embodiments into or with the constitution of another one of the embodiments, or cancel the constitution of one of the embodiments.

The present application claims priority under Japanese Patent Application No. 2016-181334 filed on Sep. 16, 2016. The entire disclosure of Japanese Patent Application No. 2016-181334 filed on Sep. 16, 2016, including the description, claims, drawings and abstract, is incorporated herein by reference in its entirety.

REFERENCE SIGN LIST

1 Steering mechanism
2 Steering wheel
3 Front wheel (steered wheel)
14 Electric motor
15 Torque sensor
19 Turning angle detecting section
20 Assist torque computing section
21 Automatic steering torque computing section
22 Automatic steering cancellation determination section
23 Motor torque control section (Section for controlling motor torque at automatic steering cancellation)
23a Change rate switch determination section
23b Turning angle rate determination section

The invention claimed is:

1. A vehicle control system for a vehicle with an electric power steering system,
the electric power steering system comprising:
a steering mechanism configured to turn a steered wheel of a vehicle;
an electric motor configured to apply steering force to the steering mechanism;
a torque sensor configured to detect a steering torque which is generated in the steering mechanism; and
a turning angle detecting section configured to detect a turning angle of the steered wheel,
the vehicle control system for a vehicle, comprising:
an assist torque computing section configured to compute an assist torque corresponding to the steering torque detected by the torque sensor;
an automatic steering torque computing section configured to compute an automatic steering torque for carrying out automatic steering of the steered wheel; and
a section for controlling a motor torque at automatic steering cancellation, which is configured to switch a change rate of the motor torque for approximating the motor torque to the assist torque according to relationship between the motor torque of the electric motor and the assist torque and according to a change in the turning angle detected by the turning angle detecting section, after the automatic steering is cancelled based on the steering torque detected by the torque sensor.

2. The vehicle control system according to claim 1, comprising:
an automatic steering cancellation determination section configured to determine that the automatic steering is cancelled in a case where the time when the steering torque detected by the torque sensor is larger than a predetermined torque continues for a predetermined period of time or longer than the predetermined period of time
during the automatic steering.

3. The vehicle control system according to claim 2,
wherein the section for controlling a motor torque at automatic steering cancellation comprises a change rate switch determination section;
the change rate switch determination section being configured to determine whether change rate switch conditions are satisfied,
the change rate switch conditions including:
that torque difference that is difference between the motor torque after the automatic steering cancellation determination by the automatic steering cancellation determination section and the assist torque is larger than a torque difference threshold value,
that angle difference that is difference between the turning angle after the automatic steering cancellation determination by the automatic steering cancellation determination section and the turning angle during the automatic steering before the cancellation determination is larger than an angle difference threshold value, and
that the torque difference and the angle difference have values with the same sign; and
wherein when the change rate switch determination section determines that the change rate switch conditions are satisfied, the change rate of the motor torque for approximating the motor torque to the assist torque is increased higher than when the change rate switch determination section determines that the change rate switch conditions are not satisfied.

4. The vehicle control system according to claim 3, wherein the section for controlling a motor torque at automatic steering cancellation comprises a turning angle rate determination section configured to determine whether a turning angle rate condition that the torque difference and a turning angle rate of the steered wheel have values with the same sign is satisfied; and wherein when the turning angle rate determination section determines that the turning angle rate condition is satisfied, the change rate of the motor torque for approximating the motor torque to the assist torque is increased higher than when the turning angle rate determination section determines that the turning angle rate condition is not satisfied.

5. The vehicle control system according to claim 2, wherein the section for controlling a motor torque at automatic steering cancellation comprises a change rate switch determination section;

the change rate switch determination section being configured to determine whether change rate switch conditions are satisfied, the change rate switch conditions including:

that torque difference that is difference between the motor torque after the automatic steering cancellation determination by the automatic steering cancellation determination section and the assist torque is larger than a torque difference threshold value, that angle difference that is difference between the turning angle after the automatic steering cancellation determination by the automatic steering cancellation determination section and a target turning angle for the automatic steering before the cancellation determination is larger than an angle difference threshold value, and that the torque difference and the angle difference have values with the same sign; and wherein when the change rate switch determination section determines that the change rate switch conditions are satisfied, the change rate of the motor torque for approximating the motor torque to the assist torque is increased higher than when the change rate switch determination section determines that the change rate switch conditions are not satisfied.

6. A vehicle control method for a vehicle with an electric power steering system, the electric power steering system comprising:

a steering mechanism configured to turn a steered wheel of a vehicle;

an electric motor configured to apply steering force to the steering mechanism;

a torque sensor configured to detect a steering torque which is generated in the steering mechanism; and a turning angle detecting section configured to detect a turning angle of the steered wheel, the vehicle control method for a vehicle comprising:

an assist torque computing step configured to compute an assist torque corresponding to a steering torque detected by the torque sensor;

an automatic steering torque computing step configured to compute an automatic steering torque for carrying out automatic steering of the steered wheel; and a step of controlling a motor torque at automatic steering cancellation, which switches a change rate of the motor torque for approximating the motor torque to the assist torque according to relationship between the motor torque of the electric motor and the assist torque and according to a change in the turning angle detected by the turning angle detecting section, after the automatic steering is cancelled based on the steering torque detected by the torque sensor.

7. The vehicle control method according to claim 6, comprising an automatic steering cancellation determination step configured to determine that the automatic steering is cancelled in a case where the time when the steering torque detected by the torque sensor is larger than a predetermined torque continues for a predetermined period of time or longer than the a predetermined period of time during the automatic steering.

8. The vehicle control method according to claim 7, wherein the step of controlling a motor torque at automatic steering cancellation comprises a change rate switch determination step;

the change rate switch determination step being configured to determine whether change rate switch conditions are satisfied, the change rate switch conditions including:

that torque difference that is difference between the motor torque after the automatic steering cancellation determination by the automatic steering cancellation determination step and the assist torque is larger than a torque difference threshold value, that angle difference that is difference between the turning angle after the automatic steering cancellation determination by the automatic steering cancellation determination step and the turning angle during the automatic steering before the cancellation determination is larger than an angle difference threshold value, and that the torque difference and the angle difference have values with the same sign; and wherein when the change rate switch determination step determines that the change rate switch conditions are satisfied, the change rate of the motor torque for approximating the motor torque to the assist torque is increased higher than when the change rate switch determination step determines that the change rate switch conditions are not satisfied.

9. The vehicle control method according to claim 8, wherein the step of controlling a motor torque at automatic steering cancellation comprises a turning angle rate determination step configured to determine whether a turning angle rate condition that the torque difference and a turning angle rate of the steered wheel have values with the same sign is satisfied; and wherein when the turning angle rate determination step determines that the turning angle rate condition is satisfied, the change rate of the motor torque for approximating the motor torque to the assist torque is increased higher than when the turning angle rate determination step determines that the turning angle rate condition is not satisfied.

10. The vehicle control method according to claim 7, wherein the step of controlling a motor torque at automatic steering cancellation comprises a change rate switch determination step;

the change rate switch determination step being configured to determine whether change rate switch conditions are satisfied, the change rate switch conditions including:

that torque difference that is difference between the motor torque after the automatic steering cancellation determination by the automatic steering cancellation determination step and the assist torque is larger than a torque difference threshold value, that angle difference that is difference between the turning angle after the automatic steering cancellation determination by the automatic steering cancellation determination step and a target turning angle for the automatic steering before the cancellation determination is larger than an angle difference threshold value, and that the torque difference and the angle difference have values with the same sign; and wherein when the change rate switch determination step determines that the change rate switch conditions are satisfied, the change rate of the motor torque for approximating the motor torque to the assist torque is increased higher than when the change rate switch determination step determines that the change rate switch conditions are not satisfied.

11. An electric power steering system comprising:
a steering mechanism configured to turn a steered wheel of a vehicle;
an electric motor configured to apply steering force to the steering mechanism;
a torque sensor configured to detect a steering torque which is generated in the steering mechanism; and
a turning angle detecting section configured to detect a turning angle of the steered wheel,
an assist torque computing section configured to compute an assist torque corresponding to the steering torque detected by the torque sensor;
an automatic steering torque computing section configured to compute an automatic steering torque for carrying out automatic steering of the steered wheel; and
a section for controlling a motor torque at automatic steering cancellation, which is configured to switch a change rate of the motor torque for approximating the motor torque to the assist torque according to relationship between the motor torque of the electric motor and the assist torque and according to a change in the turning angle detected by the turning angle detecting section, after the automatic steering is cancelled based on the steering torque detected by the torque sensor.

12. The electric power steering system according to claim 11, comprising:
an automatic steering cancellation determination section configured to determine that the automatic steering is cancelled in a case where the time when the steering torque detected by the torque sensor is larger than a predetermined torque continues for a predetermined period of time or longer than the predetermined period of time
during the automatic steering.

13. The electric power steering system according to claim 12,
wherein the section for controlling a motor torque at automatic steering cancellation comprises a change rate switch determination section;
the change rate switch determination section being configured to determine whether change rate switch conditions are satisfied,
the change rate switch conditions including:
that torque difference that is difference between the motor torque after the automatic steering cancellation determination by the automatic steering cancellation determination section and the assist torque is larger than a torque difference threshold value, that angle difference that is difference between the turning angle after the automatic steering cancellation determination by the automatic steering cancellation determination section and the turning angle during the automatic steering before the cancellation determination is larger than an angle difference threshold value, and that the torque difference and the angle difference have values with the same sign; and wherein when the change rate switch determination section determines that the change rate switch conditions are satisfied, the change rate of the motor torque for approximating the motor torque to the assist torque is increased higher than when the change rate switch determination section determines that the change rate switch conditions are not satisfied.

14. The electric power steering system according to claim 13,
wherein the section for controlling a motor torque at automatic steering cancellation comprises a turning angle rate determination section configured to determine whether a turning angle rate condition that the torque difference and a turning angle rate of the steered wheel have values with the same sign is satisfied; and
wherein when the turning angle rate determination section determines that the turning angle rate condition is satisfied, the change rate of the motor torque for approximating the motor torque to the assist torque is increased higher than when the turning angle rate determination section determines that the turning angle rate condition is not satisfied.

15. The electric power steering system according to claim 12,
wherein the section for controlling a motor torque at automatic steering cancellation comprises a change rate switch determination section;
the change rate switch determination section being configured to determine whether change rate switch conditions are satisfied,
the change rate switch conditions including:
that torque difference that is difference between the motor torque after the automatic steering cancellation determination by the automatic steering cancellation determination section and the assist torque is larger than a torque difference threshold value,
that angle difference that is difference between the turning angle after the automatic steering cancellation determination by the automatic steering cancellation determination section and a target turning angle for the automatic steering before the cancellation determination is larger than an angle difference threshold value, and
that the torque difference and the angle difference have values with the same sign; and
wherein when the change rate switch determination section determines that the change rate switch conditions are satisfied, the change rate of the motor torque for approximating the motor torque to the assist torque is increased higher than when the change rate switch determination section determines that the change rate switch conditions are not satisfied.

* * * * *